US009174561B1

(12) United States Patent
Ferlisi Wilson (10) Patent No.: US 9,174,561 B1
(45) Date of Patent: Nov. 3, 2015

(54) ARTICLE RECEPTION DEVICE FOR VEHICLES

(71) Applicant: Anthony Ferlisi Wilson, Woburn, MA (US)

(72) Inventor: Anthony Ferlisi Wilson, Woburn, MA (US)

(*) Notice: Subject to any disclaimer, the term of this patent is extended or adjusted under 35 U.S.C. 154(b) by 138 days.

(21) Appl. No.: 14/057,091

(22) Filed: Oct. 18, 2013

(51) Int. Cl.
*B60N 3/00* (2006.01)

(52) U.S. Cl.
CPC .................................... *B60N 3/00* (2013.01)

(58) Field of Classification Search
CPC .......... B60N 3/00; B60N 3/001; B60N 3/002; B60N 3/08; B60N 3/083; B60N 3/086
See application file for complete search history.

(56) References Cited

U.S. PATENT DOCUMENTS

| | | | |
|---|---|---|---|
| 4,948,195 A | | 8/1990 | Saunders |
| 5,170,720 A | * | 12/1992 | Scheurer ........................ 108/44 |
| 6,022,072 A | * | 2/2000 | Moyer ........................... 297/182 |
| 6,065,729 A | * | 5/2000 | Anderson ................... 248/311.2 |
| D533,325 S | * | 12/2006 | Bird ................................. D34/1 |
| 7,527,314 B2 | * | 5/2009 | Dohan .......................... 296/37.8 |
| 7,736,711 B2 | | 6/2010 | Dobelle |
| 7,758,090 B2 | | 7/2010 | Gregory |
| 7,891,731 B2 | | 2/2011 | O'Toole |
| 8,056,970 B1 | | 11/2011 | Phillips |
| 8,282,161 B1 | * | 10/2012 | Jacobson .................... 297/188.2 |
| D685,718 S | * | 7/2013 | Williams ..................... D12/416 |
| 2003/0034677 A1 | | 2/2003 | Marshall |
| 2004/0217615 A1 | * | 11/2004 | Lindstrom et al. ......... 296/24.34 |
| 2007/0024075 A1 | * | 2/2007 | Nakamura et al. ........... 296/37.1 |
| 2007/0029852 A1 | | 2/2007 | Kobayashi et al. |
| 2007/0241581 A1 | * | 10/2007 | Martin ......................... 296/37.8 |
| 2008/0272166 A1 | | 11/2008 | Frank et al. |
| 2008/0283565 A1 | | 11/2008 | Simon et al. |
| 2009/0096240 A1 | * | 4/2009 | Hanzel ......................... 296/37.8 |
| 2009/0108149 A1 | * | 4/2009 | Goto ........................... 248/205.1 |
| 2009/0127882 A1 | * | 5/2009 | Thibodeau ................... 296/37.8 |
| 2009/0134688 A1 | | 5/2009 | Waltman et al. |
| 2009/0224563 A1 | * | 9/2009 | Gregory ....................... 296/1.07 |
| 2011/0266820 A1 | | 11/2011 | Hurwitz |
| 2012/0204771 A1 | * | 8/2012 | Fukuhara ...................... 108/134 |
| 2014/0252811 A1 | * | 9/2014 | Whalen ........................ 297/144 |
| 2015/0114270 A1 | * | 4/2015 | Tsuchida ........................ 108/44 |

FOREIGN PATENT DOCUMENTS

WO    WO2008002520 A2    1/2008

OTHER PUBLICATIONS

Drop Stop, LLC, Drop Stop Don't drop and Drive the Original Patented Solution to Reduce Drive Distraction, website publication, date unknown, Drop Stop, LLC, Los Angeles, CA, USA.

* cited by examiner

*Primary Examiner* — Brian D Nash
(74) *Attorney, Agent, or Firm* — Thomas P. O'Connell; O'Connell Law Firm (57) ABSTRACT

An article reception device for vehicles with an article reception portion for being interposed in the gap between the vehicle seat and the central console and an article return container with an open inner volume contiguous with an open inner volume of the article reception portion. Articles dropped into the gap can be received by open inner volume of the article reception portion, and articles received by the article reception portion can be passed into the open inner volume of the article return container for retrieval. A seatbelt can pass through an aperture in the article reception portion. The article return container can project beyond the article reception portion longitudinally and laterally. The article return container can be selectively retained relative to either the first end or the second end of the article reception portion.

19 Claims, 7 Drawing Sheets

ARTICLE RECEPTION DEVICE FOR VEHICLES

FIELD OF THE INVENTION

The present invention relates generally article reception devices. More particularly, disclosed herein is an article reception device for motor vehicles for being interposed between, for instance, a vehicle seat and a center console to catch and retain articles that have been dropped or placed in the gap between the vehicle seat and console to permit the easy and convenient retrieval of the same.

BACKGROUND OF THE INVENTION

Modern automobiles and trucks typically have a front row formed by a driver's seat, a passenger seat, and a central console disposed therebetween. The seats are commonly individually adjustable forwardly, rearwardly, and, quite often, up, down, and over a given range of tilting. With that, a gap is necessarily disposed between each seat and the central console. Some manufacturers may seek to make the gap relatively small to maximize the space available for the seats and the console while other manufacturers leave a relatively large gap as they seek to make ergonomically contoured seat structures. Furthermore, it will be appreciated that the gaps between the seats and the central console can vary with the anterior, posterior, upward, downward, and pivoting adjustment of the respective seat in relation the central console.

Unfortunately, the necessary gap between the seats and the central console creates the risk of articles, particularly those pulled from a seat occupant's pocket or temporarily rested in a seat or on the center console, unintentionally falling into the gap. For instance, it is quite possible for a vehicle occupant's phone, pen, loose change, jewelry, and other valuable or precious articles to fall into the gap. Dropped articles can become wedged between, for instance, the seat support frame and the vehicle floor or console structure. With the confined space provided by the gap, retrieving articles can be difficult and frustrating. Indeed, many articles can be lost without extensive, cumbersome searching. Moreover, the attempt to retrieve dropped articles while driving presents severe danger to the vehicle occupant and bystanders. Still further, trash and debris falling into the gap can accumulate undesirably thereby contributing to an overall lack of cleanliness of the vehicle.

It would, therefore, be advantageous to prevent articles from falling into the gap between vehicle seats and the central console to a difficult to retrieve location. A number of inventors have sought to provide a solution to the issues presented by the seat gap. Under some proposed constructions, a member of foam, cardboard, or some other material is disposed simply to bridge the gap thereby to present a substantially continuous surface. While such constructions may prevent articles from falling into the gap, they do not retain the article. As a result, the item that was prevented from falling into the gap may well simply fall behind the seat or into some other similarly difficult to access location. Other proposed solutions to the issues presented by articles falling into the seat gap comprise accordion-like folding, compressible, or collapsible structures that can be interposed between the seat and the central console thereby to be in position to catch and retain fallen articles. However, many of these inventions fail to present a reasonable method for retrieving the article once it has fallen into the necessarily narrow structures. The seat occupant is thus again faced with the challenge of retrieving the fallen article from a narrow location, or he or she must remove the reception structure to retrieve the dropped article.

In light of the foregoing and further deficiencies left by the prior art, it will be appreciated that there is a recognized and ever increasing need for a device capable not only of catching and retaining dropped articles but also of facilitating their return and recovery by a vehicle occupant in an effective, safe, and convenient manner.

SUMMARY OF THE INVENTION

With a knowledge of the issues presented by the dropping and loss of articles relative to the gaps between vehicle seats and center consoles, the present inventors set forth with the basic object of providing a device capable of catching and retaining dropped articles in a motor vehicle to prevent the loss thereof.

A further object of embodiments of the invention is to provide such an article reception device that also facilitates their return and recovery by a vehicle occupant in an effective, safe, and convenient manner.

Under certain manifestations of the invention, another object is to provide an article reception device for motor vehicles that can accommodate movement of the vehicle seat in relation to the central console, such as during forward and rearward movement, raising and lowering, and pivoting of the seat structure.

Yet another object of the invention in particular embodiments is to provide an article reception device for motor vehicles that can be installed easily without specialized tools and that does not interfere with the access or operation of the central console or the vehicle in general.

These and further objects and advantages of the present invention will become obvious not only to one who reviews the present specification and drawings but also to those who have an opportunity to experience an embodiment of the article reception device for rmotor vehicles disclosed herein in use. However, it will be appreciated that, although the accomplishment of each of the foregoing objects in a single embodiment of the invention may be possible and indeed preferred, not all embodiments will seek or need to accomplish each and every potential advantage and function. Nonetheless, all such embodiments should be considered within the scope of the present invention.

In one practice of the invention, the article reception device can be configured for use relative to vehicles with a vehicle seat, a central console, and a gap between the vehicle seat and the central console. The article reception device can be founded on an article reception portion with a first end, a second end, and an open inner volume for being interposed in the gap between the vehicle seat and the central console. An article return container can have an open inner volume contiguous with the open inner volume of the article reception portion. Under this construction when the article reception portion is disposed in the gap between the vehicle seat and the central console, articles dropped into the gap can be received by the open inner volume of the article reception portion, and articles received by the article reception portion can be passed into the open inner volume of the article return container for convenient retrieval.

In certain embodiments, the article reception portion has a first longitudinal wall, a second longitudinal wall retained in opposition to the first longitudinal wall, a first end wall, a second end wall retained in opposition to the first end wall, and a floor. To permit the adjustability of the article reception device to differently sized gaps and to accommodate a movement of the vehicle seat relative to the console, the first and second end walls can be formed from flexible material, such as elastomeric mesh. The first and second end walls further can comprise lateral members, each lateral member with a first end coupled to the first longitudinal wall and a second end coupled to the second longitudinal wall, and the lateral members can be flexible. Additionally or alternatively, the lateral members can be pivotally coupled to the first and second longitudinal walls. Further adaptability and adjustability can be achieved by flexibly connecting the floor to the first and second longitudinal walls, such as by hinged connections.

Under particular practices of the invention, still further adjustability and adaptability can be realized by use of a slide panel slidably retained relative to the article reception portion, such as by being slidably engaged with the first longitudinal wall. To carry this forth, by way of example and not limitation, the first longitudinal wall can have upper and lower edges with bulbous portions, and the slide panel can have longitudinally communicating overturned, hook portions for engaging the upper and lower portions edges of the first longitudinal wall.

To permit a seatbelt and buckle to pass through the article reception portion, an aperture can be provided, such as in the floor of the article reception portion. The aperture can be lined with a flexible membrane with a slot therein lining the aperture for preventing articles from falling through the aperture inadvertently.

The article return container can project beyond the article reception portion, potentially both longitudinally and laterally. Under such constructions, the article return container forms a return and to give the overall article reception device an L-shape.

While it will be appreciated that constructions can vary within the scope of the invention, the article return container can in certain embodiments have a mouth engaged with an opening in the article reception portion. The article return container can be removable and replaceable relative to the article reception portion by a selective engagement of the mouth of the article return container with the opening of the article reception portion. There can be an opening adjacent to each of the first and second ends of the article reception portion for selectively engaging the mouth of the article return container whereby the article return container can be selectively retained relative to either the first end or the second end of the article reception portion. Accordingly, at the selection of a user, the article return container can be disposed anteriorly or posteriorly to a vehicle seat, and the article reception device can adapt to varying applications, including to both driver and passenger seats.

One will appreciate that the foregoing discussion broadly outlines the more important goals and features of the invention to enable a better understanding of the detailed description that follows and to instill a better appreciation of the inventor's contribution to the art. Before any particular embodiment or aspect thereof is explained in detail, it must be made clear that the following details of construction and illustrations of inventive concepts are mere examples of the many possible manifestations of the invention.

DISCLOSURE OF PREFERRED EMBODIMENTS

The article reception device for motor vehicles disclosed herein is subject to a wide variety of embodiments. However, to ensure that one skilled in the art will be able to understand and, in appropriate cases, practice the present invention, certain preferred embodiments of the broader invention revealed herein are described below and shown in the accompanying drawing figures.

Figure 1:
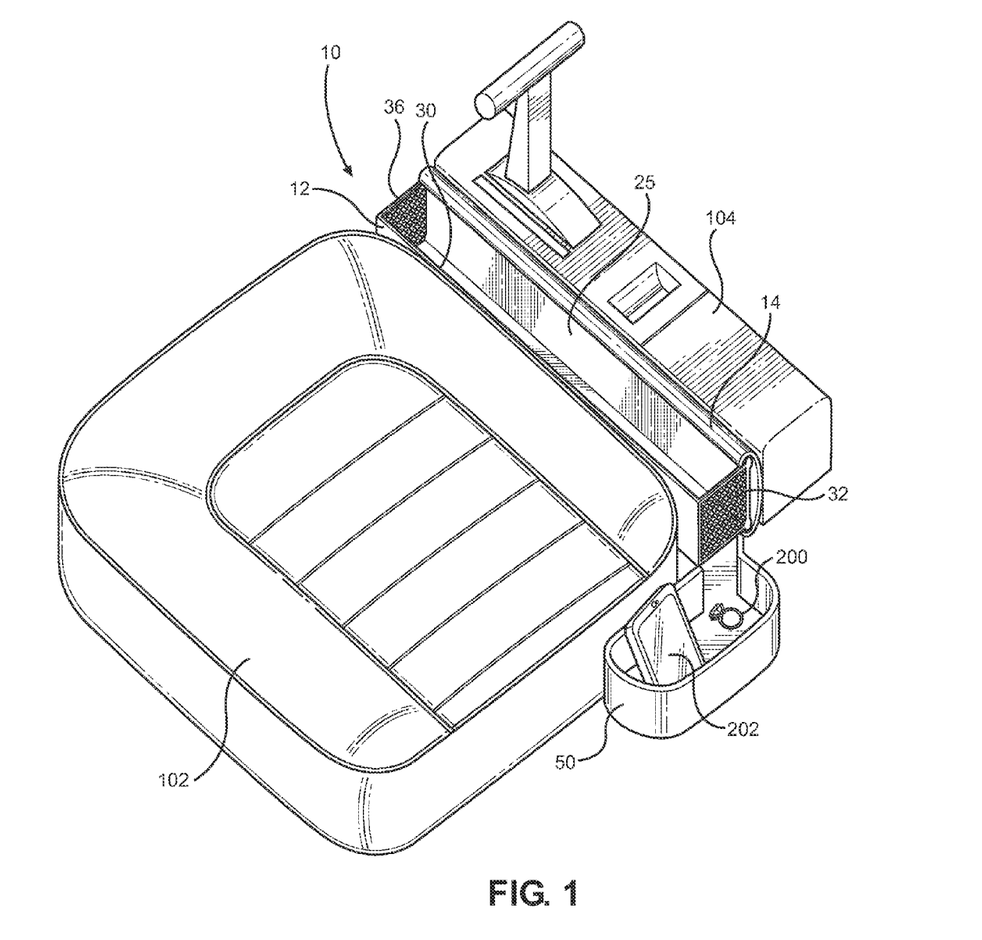
FIG. 1 is a perspective view of an article reception device for motor vehicles according to the invention shown in situ relative to a motor vehicle.

Turning more particularly to the drawings, an article reception device for motor vehicles according to the present invention is indicated generally at 10 in FIG. 1. There, the article reception device 10 is shown in situ in a motor vehicle (not shown) within the gap between a vehicle seat 102, which in this cases comprises a driver's seat, and a central console 104. The article reception device 10 is shown alone in first and second configurations in FIGS. 4A and 4B.

The article reception device 10 can be seen to have an article reception portion 14 with an open inner volume for being interposed between the vehicle seat 102 and the central console 104 to receive inadvertently, and perhaps intentionally, dropped articles and debris that would otherwise fall into the gap 105 between the vehicle seat 102 and the central console 104. With additional reference to FIGS. 2, 3, and 5, the open inner volume of the article reception portion 14 can be seen to be defined by a first longitudinal wall 25, a second longitudinal wall 30 retained in opposition to the first longitudinal wall 25, a first end wall 32, a second end wall 36 retained in opposition to the first end wall 32, and a floor 28.

Figure 2:
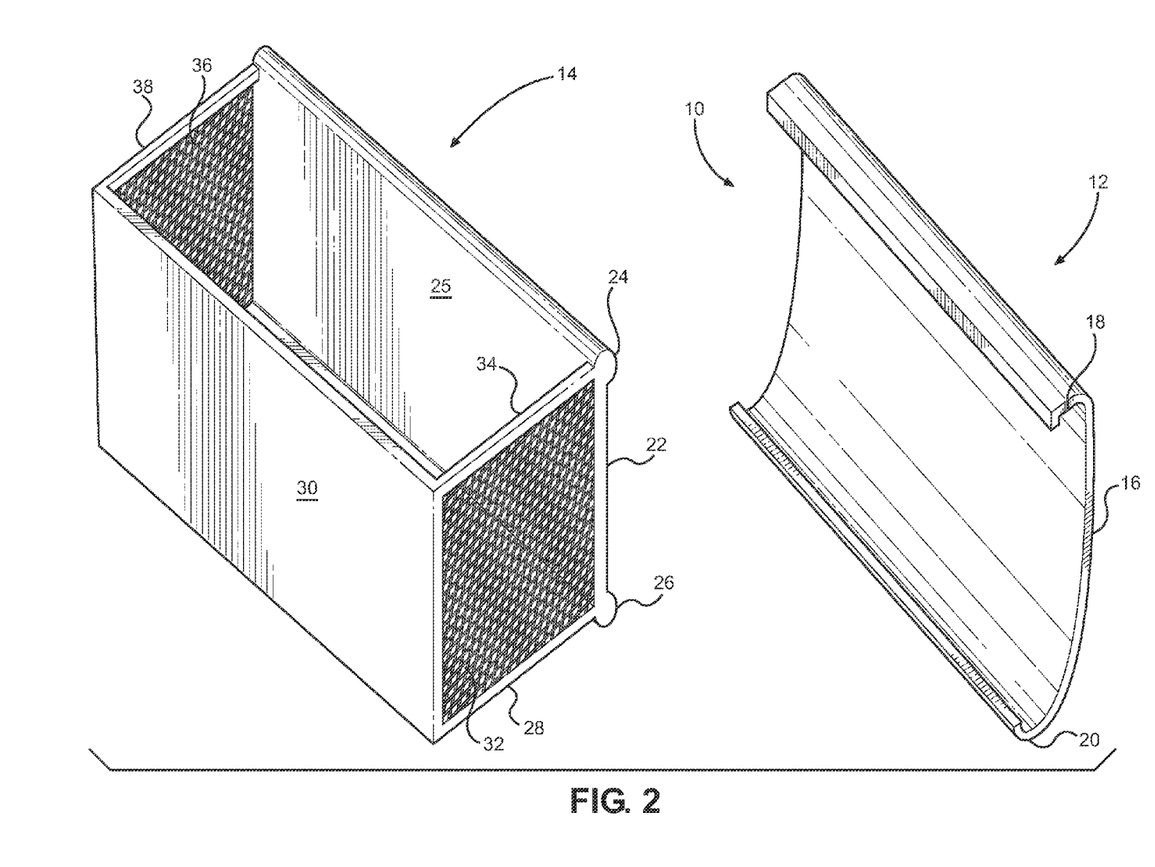
FIG. 2 is a partially exploded perspective view of a reception portion of the article reception device of FIG. 1.
Figure 3:
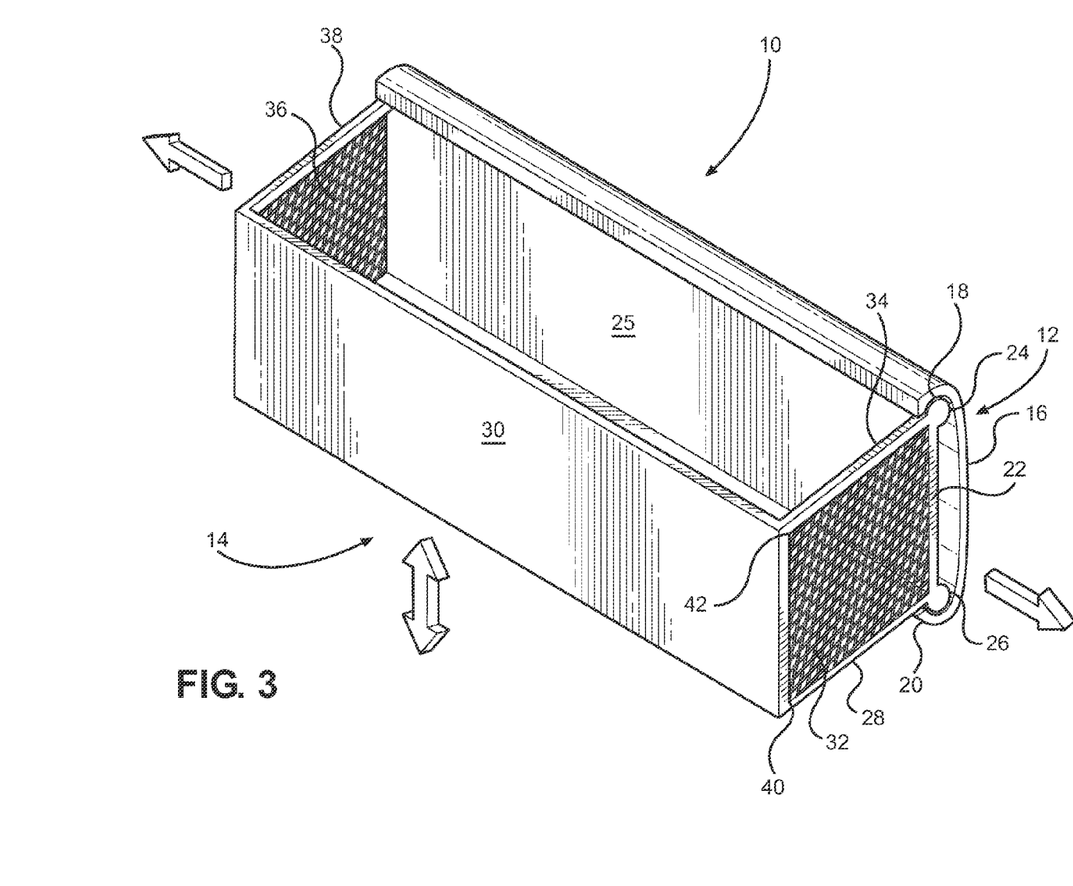
FIG. 3 is a perspective view of the reception portion of the article reception device of FIG. 1 in an assembled configuration.
Figure 5:
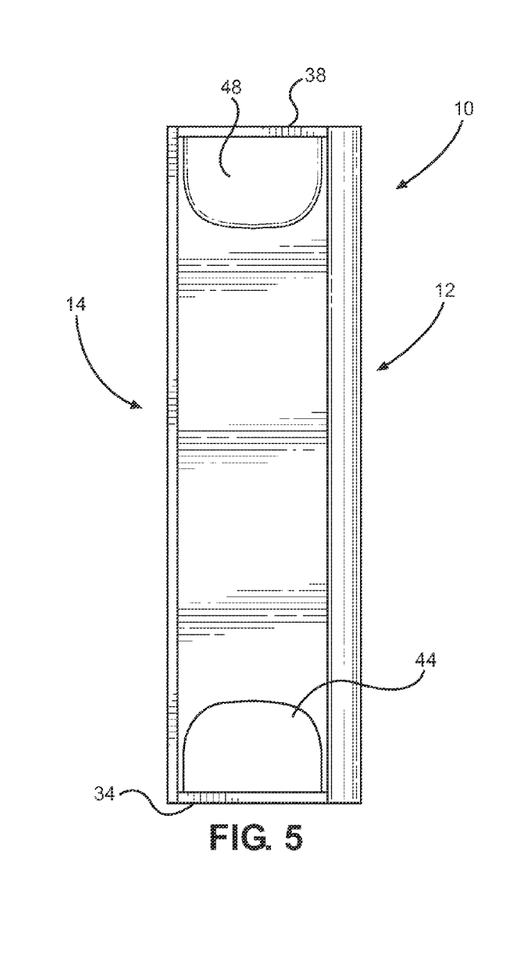
FIG. 5 is a top plan view of the reception portion of the article reception device of FIG. 1 in an assembled configuration.

The first end wall 32 can be of a flexible material, such as elastomeric mesh or any other suitable material, and can include a lateral member 34 spanning from at or adjacent to a first end of the first longitudinal wall 25 to at or adjacent to a first end of the second longitudinal wall 30. Similarly, the second end wall 36 can be of a flexible material, such as elastomeric mesh or any other suitable material, and can include a lateral member 38 spanning from at or adjacent to a second end of the first longitudinal wall 25 to at or adjacent to a second end of the second longitudinal wall 30. The lateral members 34 and 38 can be flexible and can be flexibly connected to the walls 25 and 30, such as through the resiliency of the material employed, through pivoting connections 42, or otherwise. Likewise, the floor 28 can be flexibly connected to the walls 25 and 30, such as through the resiliency of the material employed, through pivoting or hinged connections 40, or otherwise.

So constructed, the article reception portion 14 can compress, expand, flex, and pivot to accommodate differently sized gaps 105 between vehicle seats 102 and central consoles 104. Moreover, the article reception portion 14 can flex, pivot, expand, and compress in response to a movement of the seat 102 in relation to the central console 104 as the seat 102 itself is pivoted and moved up, down, forward, and backward. It will be understood that the article reception portion 14 can be shaped differently than as it is illustrated, and it can be wider, narrower, deeper, shallower, longer, or shorter than may be suggested by the drawings depending on the circumstances, including the configuration of the particular vehicle seat 102 and central console 104.

To contribute further to the ability of the article reception device 10 to accommodate longitudinal movement of the seat 102 relative to the central console 104, the article reception device 10 can additionally incorporate a slide panel 12 that can be slidably retained relative to the article reception portion 14, such as relative to the first longitudinal wall 25 or the second longitudinal wall 30. In the example shown, the slide panel 12 can be slidably engaged with the first longitudinal wall 25, such as by engaging longitudinally communicating overturned, hook portions 18 and 20 at the upper and lower edges thereof with upper and lower portions or edges 24 and 26 of the first longitudinal wall 25 as illustrated in FIGS. 2 and 3. The upper and lower portions 24 and 26 can comprise bulbous portions at the upper and lower edges of the first longitudinal wall 25 thereby to permit a secure retention of the sliding panel 12 with a panel portion 16 of the sliding panel 12 in a facing relationship with a panel portion 22 of the first longitudinal wall 25. As suggested by FIGS. 2 and 3, the panel portions 16 and 22 can be arcuate from their upper to their lower edges. With this, the slide panel 12 can slide relative to the article reception portion 14 to accommodate, for example, movement of the seat 102.

Figure 4A:
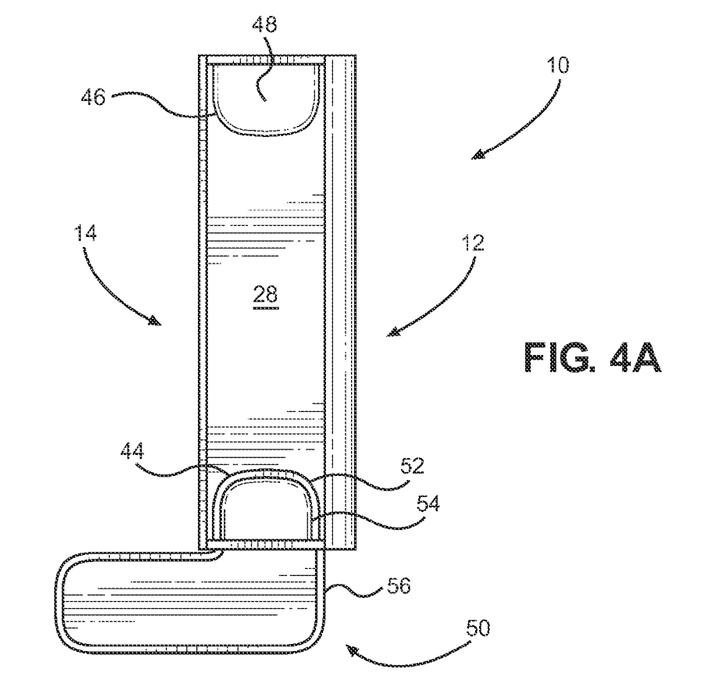
FIG. 4A is a top plan view of an article reception device for motor vehicles according to the invention with an article collection container retained relative to a first end of the article reception portion.

A seatbelt 206 can be permitted to pass through the article reception device 10, such as through an aperture 45 in the floor 28 of the article reception portion 14. To prevent articles from passing through the aperture 45, it can be lined with a flexible membrane 47, such as a polymeric panel, that can have a longitudinal, lateral, or diagonal slot 49 therein. As best illustrated in FIG. 4A, the seatbelt 206 can thus be received through the slot 49 in the flexible membrane 47 in a close relationship. In certain embodiments, as depicted herein, the aperture 45, membrane 47, and slot 49 or other means for permitting passage of the seatbelt 206 can be included adjacent to each end of the article reception portion 14 to allow the article reception device 10 to be applied in first and second, opposite orientations.

Figure 4B:
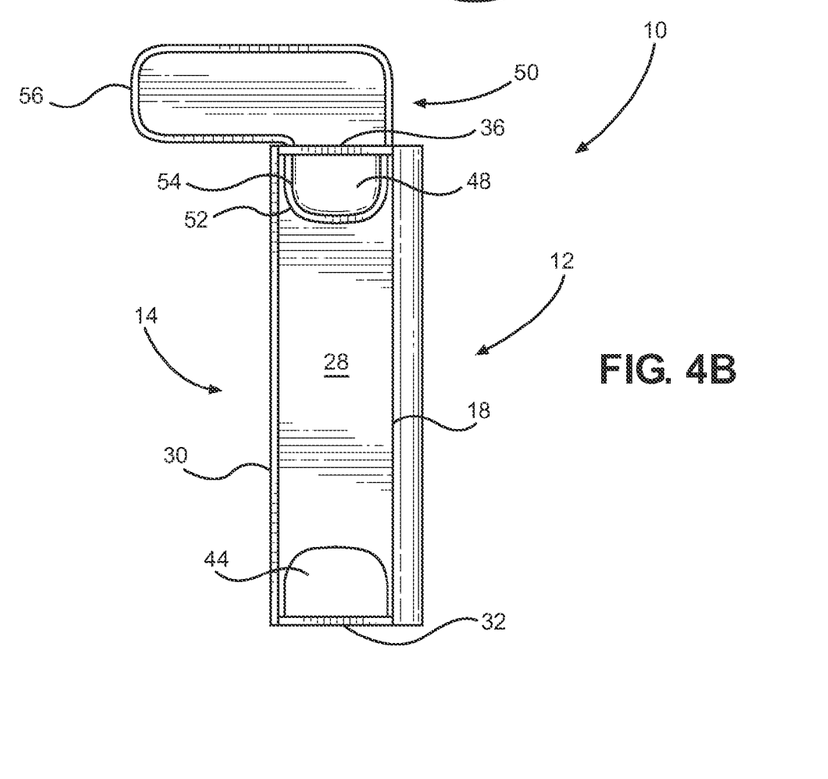
FIG. 4B is a top plan view of an article reception device for motor vehicles according to the invention with an article collection container retained relative to a second end of the article reception portion.
Figure 6:
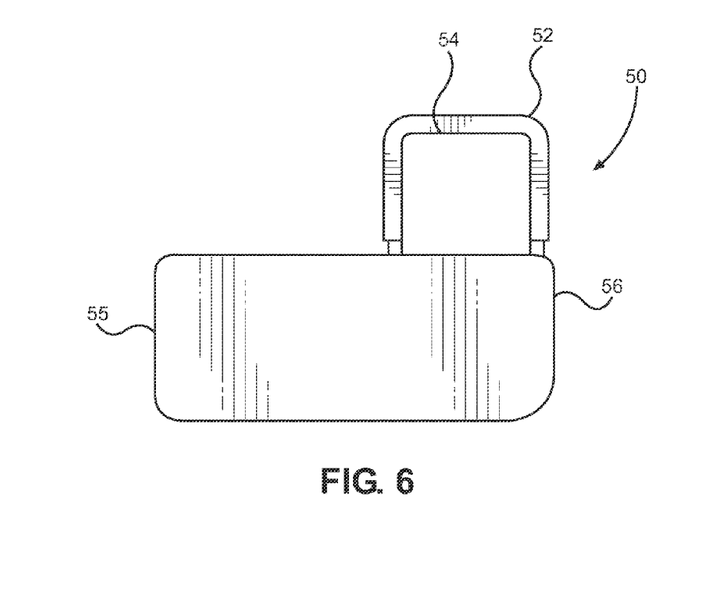
FIG. 6 is a top plan view of an article collection portion of the article reception device of FIG. 1.
Figure 7:
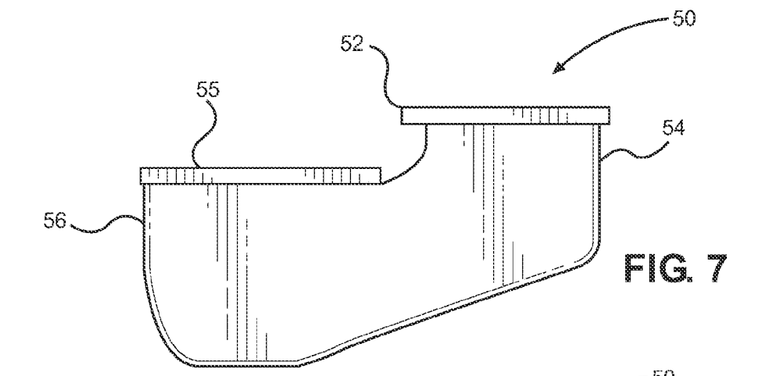
FIG. 7 is a view in rear elevation of the article collection portion of the article reception device of FIG. 1.
Figure 8:
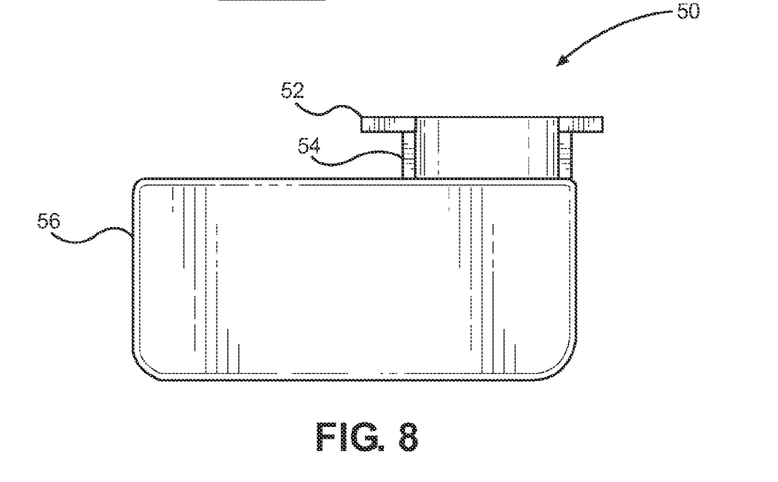
FIG. 8 is a view in front elevation of the article collection portion of the article reception device of FIG. 1.
Figure 9:
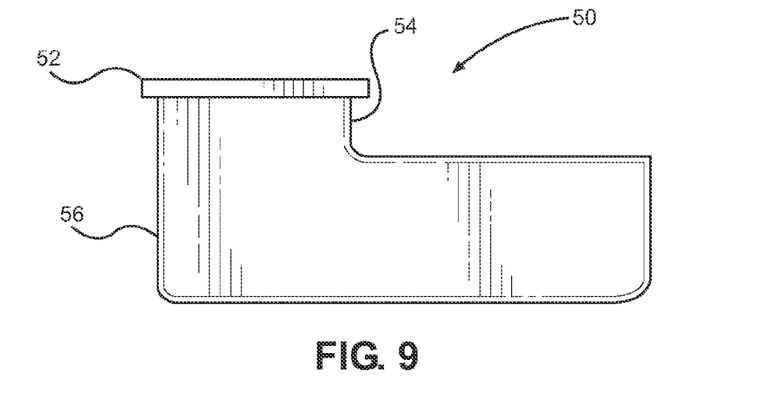
FIG. 9 is a view in side elevation of the article collection portion of the article reception device of FIG. 1.

As FIG. 1 illustrates, the article reception device 10 can include an article return container 50 for returning articles to a user in a readily retrievable manner. The article return container 50, which has an open inner volume, projects beyond the article reception portion 14, in this embodiment both longitudinally and laterally thereby to form a return and to give the overall article reception device 10 an L-shape. The article return container 50 can be integrally formed with, for example, the article reception portion 14, or the article return container 50 can be selectively coupled to the article reception portion 14 as shown in FIGS. 4A, 4B, and 5. The article return container 50 has a mouth 54 contiguous with the open inner volume of the article reception portion 14 whereby the open inner volume of the article return container 50 is contiguous and in communication with the open inner volume of the article reception portion 14. With that, articles, such as the ring 200 and the cellphone 202 in FIG. 1 or the wallet 204 in FIG. 11, can pass from the open inner volume of the article reception portion 14, through the mouth 54, and into the open inner volume of the article return container 50 for return to the user. As shown in, for instance, FIGS. 6 and 7, where desirable, the article return container 50 can have a lid 55 that can be selectively engaged to close off the open inner volume of the article return container 50.

The return of dropped articles to the article return container 50 can be automatic, such as under the force of gravity. Automatic return might be facilitated by the angle at which the article reception device 10 is retained by virtue of its general alignment with the orientation of the vehicle seat 102, which is often downwardly angled from anterior to posterior portions of the seat 102. It is also within the scope of the invention for automatic return to be facilitated by an integrated sloping of the floor 28 and possibly other components of the article reception device 10. Still further, the return of dropped articles to the article return container 50 could be assisted by the user, such as where the dropped article can be reached but not easily grasped while in the article reception portion 14.

In the depicted embodiment, the article reception portion 14 has an opening 44 in the floor 28 thereof corresponding in shape to the mouth 54 of the article return container 50 whereby the article return container 50 can be selectively coupled with the article reception portion 14 by aligning the mouth 50 with the opening 44. The article return container 50 can be retained in place by any effective means. As may be best understood with further reference to FIGS. 6 through 9, the depicted embodiment of the article return container 50 has a rim 52 that projects from the edge of the mouth 50 whereby the article return container 50 can be selectively retained in place by engaging the rim 52 with the edge of the opening 44. When so engaged, the article return container 50 projects longitudinally and laterally beyond the article reception portion 14.

As shown in FIGS. 4A, 4B, and 5, the article return container 50 in this exemplary embodiment can be selectively engaged with either the first end or the second end of the article reception portion 14. This could be accomplished in a plurality of ways, each within the scope of the invention except as it might be expressly limited by the claims. In this example, the article reception portion 14 has openings 44 at each of the first and second ends thereof whereby the article return container 50 can be engaged with the first end of the article reception portion 14 as shown, for example, in FIG. 4A or with the second end of the article reception portion 14 as shown, for example, in FIG. 4B. As seen in FIG. 4A, the opening 44 at the end to which the article return container 50 is not retained can be closed by a panel 48. The panel 48 can be retained in any effective manner. In one practice of the invention, the panel 48 can be connected by a frangible connection 46, such as a thinned and, additionally or alternatively, perforated line.

The selective retention of the article return container 50 with either end of the article reception portion 14 permits a plurality of advantages. For instance, the article reception portion 14 can be disposed with either longitudinal wall 25 or 30 facing the central console 104. Furthermore, an article return container 50 can be retained to either the anterior end of the vehicle seat 102 or the posterior end of the vehicle seat 102, which may be useful depending on the configuration of the vehicle in which the article retention device 10 is disposed. Moreover, the ability to retain the article return container 50 to the anteriorly disposed end of the article reception portion 14 may be advantageous in relation to seats 102 in busses, trains, and other vehicles. It will be further appreciated that, while the article retention device 10 has been shown and described largely in relation to motor vehicles, there is no need for such a limitation to the application of the invention. Indeed, one could fathom the article retention device 10 being readily employed in relation to other seats 102, such as theater seats and still other applications. Accordingly, except as it may be expressly limited by the claims, the invention should not be interpreted as limited to motor vehicles.

Figure 10:
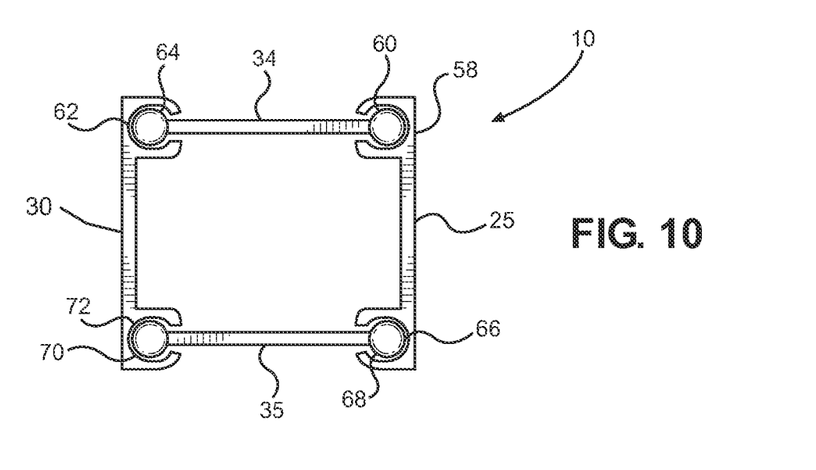
FIG. 10 is a cross-sectional view an alternative reception portion of an article reception pursuant to the invention.
Figure 11:
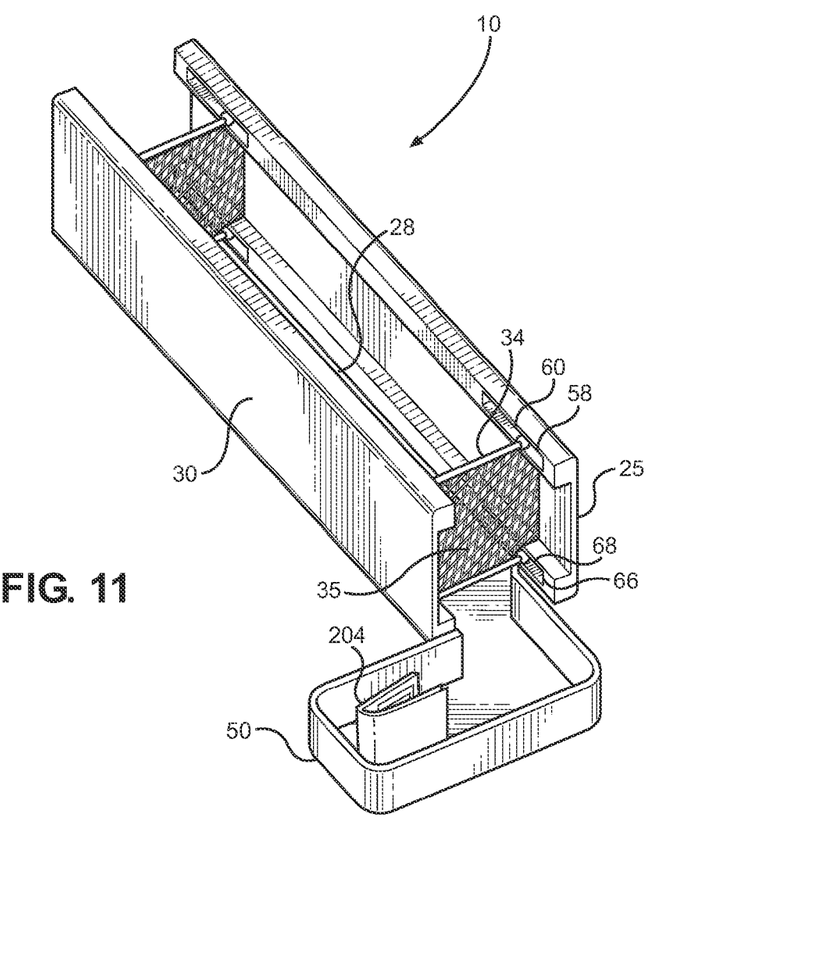
FIG. 11 is a perspective view an article reception device incorporating the article reception portion of FIG. 10.

An alternative embodiment of the article retention device 10 is shown in FIG. 11 and in cross section in FIG. 10. There, the article reception portion 14 again has an open inner volume defined by a first longitudinal wall 25, a second longitudinal wall 30 retained in opposition to the first longitudinal wall 25, a first end wall 32, a second end wall 36 retained in opposition to the first end wall 32, and a floor 28. The first end wall 32 can be of a flexible material, such as elastomeric mesh or any other suitable material, and can include a lateral member 34 spanning from at or adjacent to a first end of the first longitudinal wall 25 to at or adjacent to a first end of the second longitudinal wall 30. Similarly, the second end wall 36 can be of a flexible material, such as elastomeric mesh or any other suitable material, and can include a lateral member 38 spanning from at or adjacent to a second end of the first longitudinal wall 25 to at or adjacent to a second end of the second longitudinal wall 30. Here, the lateral members 34 and 38 can again be flexible and are pivotally coupled to the first and second longitudinal walls 25 and 30 by bulbous end portions 60 and 64 being slidably and pivotally retained in C-shaped channels 58 and 62 in upper portions of the walls 25 and 30. Similarly, the floor 28 is pivotally and slidably connected to the first and second longitudinal walls 25 and 30 by bulbous projections 66 and 70 pivotally and slidably received in C-shaped channels 68 and 72 at lower portions of the walls 25 and 30. With this, the walls 25 and 30 and the floor 28 are relatively slidable and pivotable relative to one another. An article return container 50 is again retained relative to the article reception portion 14 to receive dropped articles therefrom for convenient access and retrieval.

So constructed, the article reception portion 14 can compress, expand, flex, and pivot to accommodate differently sized gaps 105 between vehicle seats 102 and central consoles 104. Moreover, the article reception portion 14 can flex, pivot, expand, and compress in response to a movement of the seat 102 in relation to the central console 104 as the seat 102 itself is pivoted and moved up, down, forward, and backward. It will again be understood that the article reception portion 14 can be shaped differently than as it is illustrated, and it can be wider, narrower, deeper, shallower, longer, or shorter than may be suggested by the drawings depending on the circumstances, including the configuration of the particular vehicle seat 102 and central console 104.

Under either embodiment, the article reception device 10 can be applied in relation to a seat 102, such as in the gap 105 between a vehicle seat 102 and a central console as depicted in FIG. 1, with the article return container 50 projecting beyond the article reception portion 14 for convenient access by the user. Where desirable, the article return container 50 can be disposed anterior to the seat 102, such as by projecting forward of the article reception portion 14 and toward a centerline of the seat 102, or posterior to the seat 104, such as by projecting posteriorly of the article reception portion 14 and toward a centerline of the seat 102. When an article, such as a ring 200, a phone 202, a wallet 204, or some other valuable article or item of debris or refuse, is dropped into the article reception portion 14, it is thus prevented from falling irretrievably into the gap 105. Moreover, the article can either automatically or with assistance by the user be caused to fall through the mouth 54 and into the open inner volume of the article return container 50 where it can be retrieved when desired conveniently and easily.

With certain details of the present invention for an article reception device for vehicles disclosed, it will be appreciated by one skilled in the art that changes and additions could be made thereto without deviating from the spirit or scope of the invention. This is particularly true when one bears in mind that the presently preferred embodiments merely exemplify the broader invention revealed herein. Accordingly, it will be clear that those with certain major features of the invention in mind could craft embodiments that incorporate those major features while not incorporating all of the features included in the preferred embodiments.

Therefore, the following claims are intended to define the scope of protection to be afforded to the inventor. Those claims shall be deemed to include equivalent constructions insofar as they do not depart from the spirit and scope of the invention. It must be further noted that a plurality of the following claims may express certain elements as means for performing a specific function, at times without the recital of structure or material. As the law demands, these claims shall be construed to cover not only the corresponding structure and material expressly described in this specification but also all equivalents thereof that might be now known or hereafter discovered.

The invention claimed is:

1. An article reception device for vehicles with a vehicle seat, a central console, and a gap between the vehicle seat and the central console, the article reception device comprising:
    an article reception portion with a first end, a second end, and an open inner volume for being interposed in the gap between the vehicle seat and the central console; and
    an article return container with an open inner volume contiguous with the open inner volume of the article reception portion;
    wherein the article reception portion has a first longitudinal wall, a second longitudinal wall retained in opposition to the first longitudinal wall, a first end wall, a second end wall retained in opposition to the first end wall, and a floor wherein the first and second end walls are formed from flexible material comprising elastomeric mesh; and
    whereby, when the article reception portion is disposed in the gap between the vehicle seat and the central console, articles dropped into the gap can be received by the open inner volume of the article reception portion and whereby articles received by the article reception portion can be passed into the open inner volume of the article return container for retrieval.

2. The article reception device of claim 1 wherein the first and second end walls further comprise lateral members, each lateral member with a first end coupled to the first longitudinal wall and a second end coupled to the second longitudinal wall.

3. The article reception device of claim 2 wherein the lateral members are flexible.

4. The article reception device of claim 2 wherein the lateral members are pivotally coupled to the first and second longitudinal walls.

5. The article reception device of claim 2 wherein the floor is flexibly connected to the first and second longitudinal walls.

6. The article reception device of claim 5 wherein the floor is flexibly connected to the first and second longitudinal walls by hinged connections.

7. An article reception device for vehicles with a vehicle seat, a central console, and a gap between the vehicle seat and the central console, the article reception device comprising:
- an article reception portion with a first end, a second end, and an open inner volume for being interposed in the gap between the vehicle seat and the central console;
- an article return container with an open inner volume contiguous with the open inner volume of the article reception portion;
- a slide panel slidably retained relative to the article reception portion;
- wherein the article reception portion has a first longitudinal wall, a second longitudinal wall retained in opposition to the first longitudinal wall, a first end wall, a second end wall retained in opposition to the first end wall, and a floor;
- whereby, when the article reception portion is disposed in the gap between the vehicle seat and the central console, articles dropped into the gap can be received by the open inner volume of the article reception portion and whereby articles received by the article reception portion can be passed into the open inner volume of the article return container for retrieval.

8. The article reception device of claim 7 wherein the slide panel is slidably engaged with the first longitudinal wall.

9. The article reception device of claim 8 wherein the first longitudinal wall has upper and lower edges with bulbous portions and wherein the slide panel has longitudinally communicating overturned, hook portions for engaging the upper and lower portions edges of the first longitudinal wall.

10. An article reception device for vehicles with a vehicle seat, a central console, and a gap between the vehicle seat and the central console, the article reception device comprising:
- an article reception portion with a first end, a second end, a floor, and an open inner volume for being interposed in the gap between the vehicle seat and the central console;
- an article return container with an open inner volume contiguous with the open inner volume of the article reception portion;
- wherein the article reception portion has an aperture for permitting a seatbelt to pass therethrough and wherein the aperture for permitting a seatbelt to pass therethrough comprises an aperture in the floor of the article reception portion and further comprising a flexible membrane with a slot therein lining the aperture;
- whereby, when the article reception portion is disposed in the gap between the vehicle seat and the central console, articles dropped into the gap can be received by the open inner volume of the article reception portion and whereby articles received by the article reception portion can be passed into the open inner volume of the article return container for retrieval.

11. The article reception device of claim 10 wherein the article return container projects beyond the article reception portion.

12. An article reception device for vehicles with a vehicle seat, a central console, and a gap between the vehicle seat and the central console, the article reception device comprising:
- an article reception portion with a first end, a second end, and an open inner volume for being interposed in the gap between the vehicle seat and the central console;
- an article return container with an open inner volume contiguous with the open inner volume of the article reception portion wherein the article return container projects beyond the article reception portion and wherein the article return container projects beyond the article reception portion longitudinally and laterally thereby to form a return and to give the overall article reception device an L-shape;
- whereby, when the article reception portion is disposed in the gap between the vehicle seat and the central console, articles dropped into the gap can be received by the open inner volume of the article reception portion and whereby articles received by the article reception portion can be passed into the open inner volume of the article return container for retrieval.

13. An article reception device for vehicles with a vehicle seat, a central console, and a gap between the vehicle seat and the central console, the article reception device comprising:
- an article reception portion with a first end, a second end, and an open inner volume for being interposed in the gap between the vehicle seat and the central console;
- an article return container with an open inner volume contiguous with the open inner volume of the article reception portion wherein the article return container has a mouth engaged with an opening in the article reception portion;
- whereby, when the article reception portion is disposed in the gap between the vehicle seat and the central console, articles dropped into the gap can be received by the open inner volume of the article reception portion and whereby articles received by the article reception portion can be passed into the open inner volume of the article return container for retrieval.

14. The article reception device of claim 13 wherein the article return container is removable and replaceable relative to the article reception portion by a selective engagement of the mouth of the article return container with the opening of the article reception portion.

15. The article reception device of claim 13 wherein the opening is adjacent to the first end of the article reception portion.

16. The article reception device of claim 13 wherein the article reception portion has a first longitudinal wall, a second longitudinal wall retained in opposition to the first longitudinal wall, a first end wall, a second end wall retained in opposition to the first end wall, and a floor.

17. The article reception device of claim 16 wherein the first and second end walls are formed from flexible material.

18. The article reception device of claim 13 wherein the article reception portion has an aperture for permitting a seatbelt to pass therethrough.

19. An article reception device for vehicles with a vehicle seat, a central console, and a gap between the vehicle seat and the central console, the article reception device comprising:
- an article reception portion with a first end, a second end, and an open inner volume for being interposed in the gap between the vehicle seat and the central console;
- an article return container with an open inner volume contiguous with the open inner volume of the article reception portion wherein the article return container can be selectively retained relative to either the first end or the second end of the article reception portion;
- whereby, when the article reception portion is disposed in the gap between the vehicle seat and the central console, articles dropped into the gap can be received by the open inner volume of the article reception portion and whereby articles received by the article reception portion can be passed into the open inner volume of the article return container for retrieval.

* * * * *